Aug. 8, 1933. W. F. FRASER 1,920,979
FEEDING MECHANISM FOR MACHINE TOOLS
Filed Jan. 11, 1929 3 Sheets-Sheet 2
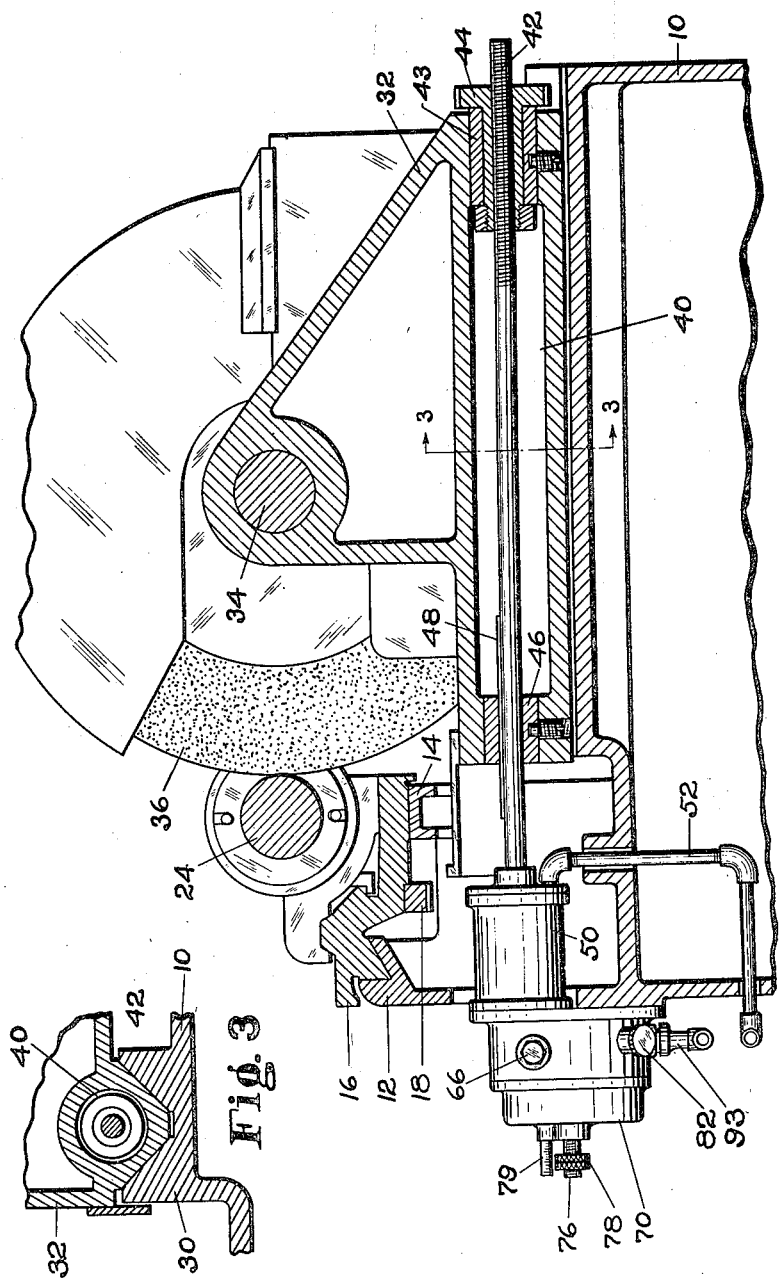
WITNESSES
E. H. Goodrich
L. M. Hoyt
Inventor
WARREN F. FRASER
By Clayton L. Jenks
Attorney

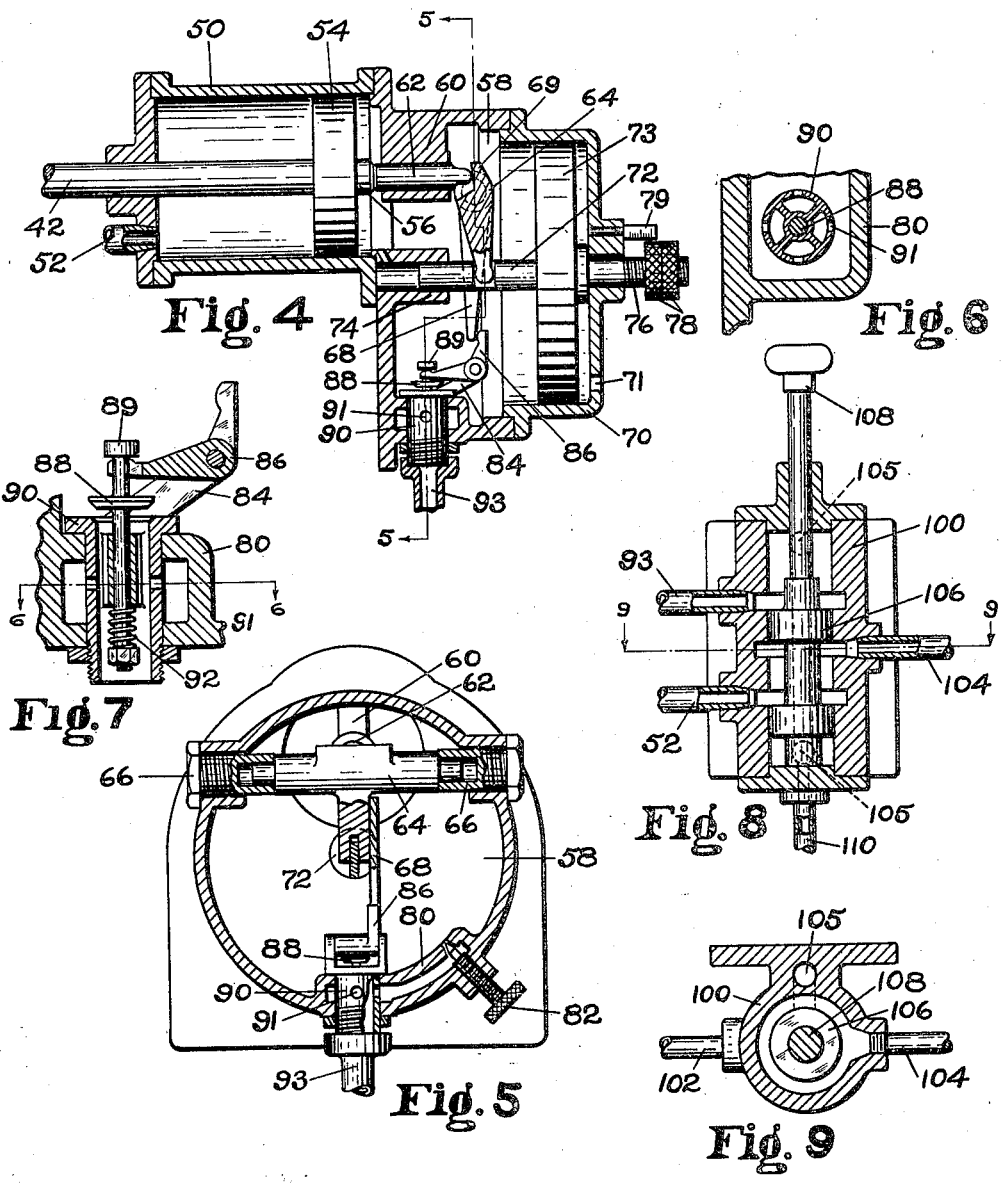

Patented Aug. 8, 1933

1,920,979

UNITED STATES PATENT OFFICE 1,920,979

FEEDING MECHANISM FOR MACHINE TOOLS

Warren F. Fraser, Westboro, Mass., assignor to Norton Company, Worcester, Mass., a Corporation of Massachusetts Application January 11, 1929. Serial No. 331,761

24 Claims. (Cl. 51—95)

This invention relates to feeding mechanism for machine tools wherein it is desirable to effect a relative movement of the work and operating tool at two different rates of speed. While the invention is of general application, it is of particular value as embodied in grinding machines wherein the work and the grinding element are relatively moved toward each other, first at a rapid rate and then at a slow rate. Accordingly, the invention will be first disclosed in its application to grinding machines.

In the operation of certain types of grinding machines, it is desirable that the feed mechanism be so organized as to bring the grinding wheel and the work rapidly into close proximity and thereafter relatively feed the wheel and work slowly and with great precision during the grinding operation, then stop the feeding movement to permit the wheel to grind itself out and finally rapidly separate the wheel and the finished work. In one aspect, my invention consists in a fluid pressure feeding mechanism wherein the rate of feed is controlled by the rate of fluid displacement of a piston moving with, or constituting the actuating member of, the feeding mechanism and having provision whereby the rate of piston displacement may be reduced at the point in the travel of the actuator at which the feeding movement is changed from rapid to slow, or vice versa. Feed mechanism controlled in its operation by this principle is believed to be broadly new and, as already intimated, its application is in no sense limited to grinding machines.

The manner in which the rate of piston displacement may be varied is of considerable importance in that it must be subject to accurate control and must be effected smoothly and without shock to the moving parts. It is, moreover, important to maintain complete control of the feed carriage throughout its feeding movement and at the time of its transition from rapid to slow feeding movement. All this is accomplished in accordance with an important feature of my invention by providing a supplementary member arranged to cooperate with the actuator, or with the displacing member controlling the actuator, in displacing fluid in a pressure chamber, combined with means for changing the ratio of fluid displacement by said members. For example, if the actuator comprises a fluid-actuated piston, this may be utilized in combination with a second piston to displace a constant volume of fluid from a pressure chamber. By regulating the movement of the second piston, the rate of displacement by the first piston may be varied and its rate of movement correspondingly controlled.

Another manner of varying the rate of piston displacement in such feeding mechanism consists in adjusting the effective area of the outlet through which the fluid must be displaced. This has been attempted under automatic control heretofore but, in accordance with the present invention, this expedient is utilized for the first time under the control of the piston or the member moving with the feed carriage. In those cases where the actuating member of the feed mechanism is fluid-operated, a similar result would be accomplished by varying the size of the inlet passage. Accordingly, it is within the scope of my invention to vary the effective size of either the inlet or the exhaust passage, controlling such variation by the movement of the piston or cylinder, whichever constitutes the moving member of the organization.

Still another feature of the invention consists in the combination with a fluid pressure actuator of means actuated thereby for both providing supplementary displacement of the fluid in the system and changing the effective opening of either the exhaust or the inlet passages. In this way, the movement of the actuator and its associated feed carriage may be varied within wide limits, accurately controlled in its extent and terminated with an extreme degree of precision.

While my invention is in no sense limited in its application to grinding machines, it has not been utilized heretofore in that connection. Accordingly, in a more specific aspect my invention consists in a grinding machine including in its organization fluid pressure controlling mechanism of the character above discussed.

These and other features of the invention will be best understood and appreciated from the following description of a preferred embodiment thereof, selected for purposes of illustration and shown in the accompanying drawings, in which Fig. 1 is a view in front elevation of a grinding machine having my invention embodied therein;

Fig. 2 is a sectional view on the line 2—2 of Fig. 1 and on an enlarged scale;

Fig. 3 is a fragmentary sectional view on the line 3—3 of Fig. 2;

Fig. 4 is a sectional view of the piston, pressure chamber and associated parts on the line 4—4 of Fig. 1;

Fig. 5 is a view in cross section on the line 5—5 of Fig. 4;

Fig. 6 is a cross sectional view of the outlet valve on the line 6—6 of Fig. 7;

Fig. 7 is a view in longitudinal section of the outlet valve;

Fig. 8 is a view in longitudinal section of the starting valve; and

Fig. 9 is a cross sectional view on the line 9—9 of Fig. 8.

Figure 1:
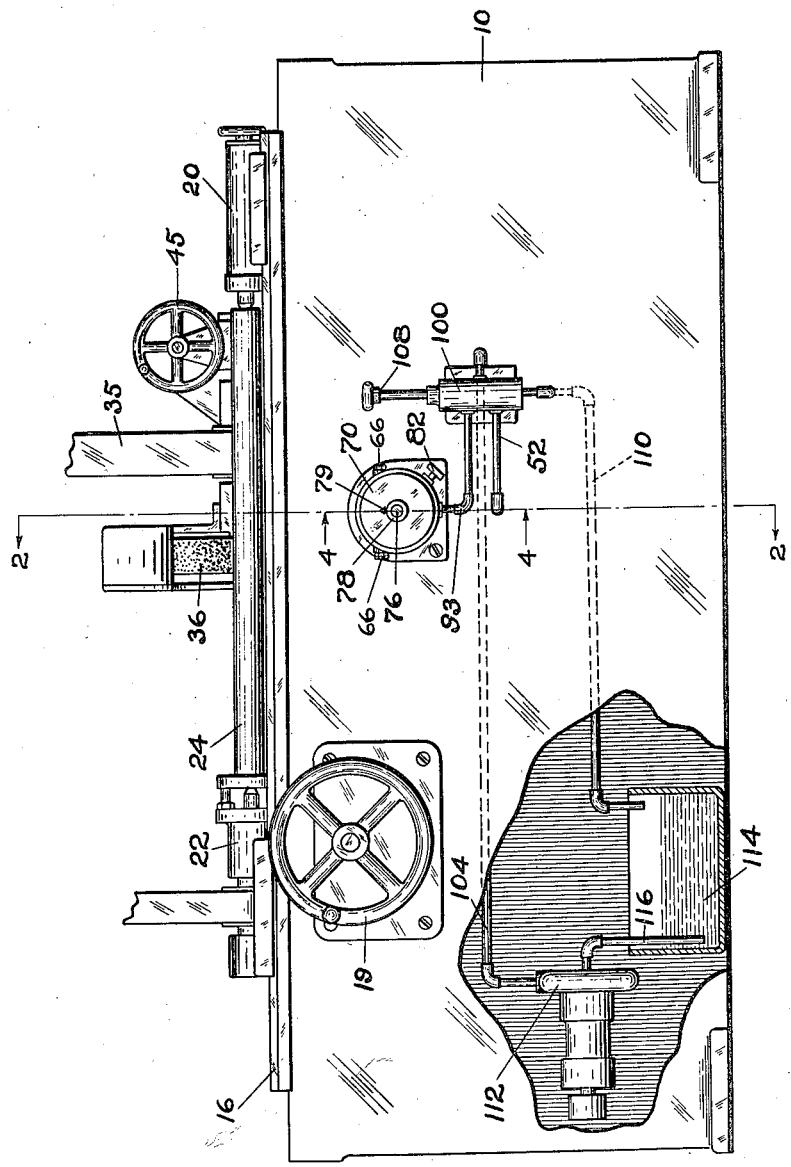

The invention is herein shown as embodied in a cylinder grinding machine comprising a base or casing 10 having longitudinally extending ways 12 and 14 formed in its upper surface for a slidable work supporting table 16. The table has a rack 18 secured to its lower side, as shown in Fig. 2, and the position of the table on the frame is controlled by geared connections operated by a hand wheel 19 in the usual manner. The work to be ground is herein shown as a shaft 24 and this is arranged to be supported upon the feed slide by a tail-stock 20 and a driven head-stock 22.

The base 10 is also provided with transversely extending V-ways 30, see Fig. 3, in which is mounted the support or carriage 32 for the abrading element, which consists in a grinding wheel 36 mounted upon a shaft 34 journaled in the carriage 32 and driven by a belt 35 from any suitable source of power. The carriage 32 for the grinding wheel and the table 16 for the work constitutes the cooperating supports or members which it is desired to move relatively toward and from each other for effecting the grinding operation. As herein shown, the carriage 32 is arranged to move toward the table.

The base of the carriage 32 is shaped to fit in the transverse ways 30 and is provided with a cylindrical chamber 40 having a bushing 43 at its rear end and a bushing 46 at its forward end, both of which are retained in place in the carriage by set screws. An actuating rod 42, by which movement is imparted to the carriage 32, extends through the bushings 43 and 46. At its forward end it is provided with a key 48 which slides in a keyway in the bushing 46 and thus prevents turning of the rod 42. At its rear end the rod is threaded to receive a nut 44 journaled in the bushing 43 and having its rear end formed as a pinion. An initial adjustment of the carriage 32 upon the actuating rod 42 may be effected by rotating the nut 44 and this is effected by geared connections, not shown, with a hand wheel 45 mounted in brackets on the carriage 32.

The base or casing 10 carries within its front wall a fluid pressure cylinder 50 in which operates a piston 54 which is secured to the forward end of the actuating rod 42. Fluid under pressure admitted to the opposite ends of the cylinder 50 effects movement of the piston and corresponding movement of the carriage 32, as will be apparent. An inlet pipe 52 communicates with the cylinder 50 through its rear head and is connected to a controlling valve 100, to be referred to hereinafter. The forward head of the cylinder 50 comprises a cylindrical pressure chamber 58 of larger diameter than the cylinder 50 and being secured to the outer wall of the casing 10. The pressure chamber 58 carries and communicates directly with a secondary cylinder 70, also of larger diameter than the cylinder 50 and arranged concentrically with respect to the pressure chamber 58. A secondary piston secured to a piston rod 72 operates in the cylinder 70 and is arranged to make a short stroke during the latter part of the stroke of the actuating piston 54.

The pressure chamber 58 has an internal radially extending web 60 in which is slidingly mounted a contact rod 62 disposed in alignment with an extension 56 of the piston rod 42. The pressure chamber is provided with a pair of oppositely disposed bosses to receive threaded bearing members 66, in which is journaled a rocker member 64 having a short arm 69 arranged to be engaged by the contact rod 62. The long arm of the rocker member 64 is received in a notch in the secondary piston rod 72. The ratio of the two arms of the rocker member 64 is approximately one to five, so that the supplementary and larger piston 73 is moved toward the left at five times the rate of speed of the actuating piston 54 during its stroke.

The pressure chamber 58 is provided with an outlet 93 through which both the pistons 54 and 73 discharge. Two ports communicate with the outlet 93 and the pressure chamber 58. These are formed in an internal partition 80 disposed circumferentially in the lower side of the pressure chamber. Of these, the direct port comprises a cylinder 90 extending through both the partition wall 80 and the outer wall of the pressure chamber, opening into the outlet 93 and having a valve seat for a poppet valve 88 at its inner end. The stem of the valve 88 slides in an internal guide within the cylinder 90 and is provided at its lower end with a compression spring 92 tending at all times to close the valve 88. At its inner end the valve stem is provided with a head 89 beneath which engages the forked arm of a lever 86 mounted in a bracket 84 within the pressure chamber and cooperating with an arm 68 which is secured to the long arm of the rocker member 64. The cylinder 90 is provided with radial openings 91 leading to the space between the partition wall 80 and the outer wall of the pressure chamber 58. The second or by-pass port is formed in the partition wall 80 at one side of the direct port and its effective opening is controlled by a needle valve 82 threaded into a boss in the outer wall of the pressure chamber. It will be apparent that when the supplementary piston 73 occupies its initial position at the right hand end of the supplementary cylinder, as seen in Fig. 4, and the rocker member 64 is, consequently swung toward the right at the bottom, the arm 68 holds the valve 88 open through the lever 86. The pressure chamber is, therefore, free to discharge through both ports to the outlet 93. When the supplementary piston 73 is moved to the left, however, the valve 88 is lowered by the spring 92 and the pressure of the fluid upon it. When this valve is closed, the pressure chamber can discharge only through the small by-pass port at a rte regulated by the setting of the needle valve.

The piston rod 72 of the supplementary piston 73 slides at one end in bearings formed in a centrally disposed boss 74 in the pressure chamber and at the other end in bearings formed in a boss in the head of the cylinder 70. A relief outlet is formed in the boss 74 and an opening 71 in the head of the cylinder 70 to insure proper conditions of pressure ahead of the piston rod 72 and behind the piston 73. The outer end 76 of the supplementary piston rod is threaded and provided with a pair of stop nuts 78 which may be adjusted by reference to a scale 79 projecting from the boss of the cylinder 70 so as to positively limit the stroke of the supplementary piston and, consequently, the stroke of the actuating piston 54.

A motor-driven pump 112 is mounted within the casing 10 and serves as a source of fluid pressure for the system. The pump 112 is supplied with oil from a reservoir 114 through an inlet pipe 116 and discharges through an outlet pipe 104 to the controlling valve 100. An exhaust pipe 110 leads from the controlling valve back to the reservoir 114.

The controlling valve 100 comprises a cylinder, best shown in Fig. 8, having a vertical cylindrical chamber in which slides the valve member 106 having an upwardly extending operating handle 108. The discharge or pressure pipe 104 from the pump communicates with the valve chamber at its central portion and is made to communicate either with the inlet pipe 52 leading to the cylinder 50 or the outlet 93 of the pressure chamber, according to the position of the valve member 106. As shown in Fig. 8, the inlet pipe 104 communicates with the inlet pipe 52, in which position fluid pressure is imparted to the actuating piston 54 to cause it to make its operative stroke. The exhaust pipe 110 enters the lower portion of the controlling valve 100 and communicates, through an internal passage 105, with either end of the valve chamber. As shown in Fig. 8, the outlet pipe 93 from the pressure chamber 58 is in direct communication with the upper branch of the passage 105 so that it is thus free to discharge back to the reservoir 114. It will be apparent that when the valve handle 108 is pulled upwardly, the pressure pipe 104 is put in communication with the outlet pipe 93 of the pressure chamber and the inlet pipe 52 put in communication with the exhaust pipe 110 through the lower branch of the passage 105. Under these conditions, both the pistons make their return stroke at a high rate of speed, the valve 88 being opened to its full extent by the fluid pressure upon it and fluid entering the pressure chamber through this direct port as well as through the needle valve which is always open.

The operation of the machine will be apparent from the foregoing description but may be summarized as follows: The shaft 24 to be ground is first properly set up and rotated on the work supporting table 16 and the grinding wheel 36 is driven through the belt 35. The carriage 32 initially occupies a position in which the grinding wheel 36 is separated from the shaft 24 by an amount determined by the initial adjustment of the nut 44 through the hand wheel 45. The operator sets the machine in motion by depressing the controlling valve handle 108 to the position shown in Fig. 8 and establishing communication between the pressure pipe 104 and the inlet pipe 52 of the cylinder 50. Oil under pressure admitted behind the piston 54 moves the piston rapidly toward the right, as seen in Fig. 4, or toward the left, as seen in Fig. 2, feeding the carriage 32 and the grinding wheel at high speed approximately into initial contact with the work to be ground. During this high speed feeding movement, the supplementary piston 73 remains at rest and the direct port is wide open so that the cylinder 50 is free to be discharged directly and without obstruction through the outlet 93.

When the piston 54 has completed its initial movement, the rod extension 56 encounters the contact rod 62 and swings the rocker member 64 toward the left, actuating the supplementary piston 73 and moving that toward the left at five times the rate of the actuating piston travel. The supplementary piston 73, as already noted, is of substantially larger diameter than the actuating piston 54 so that it displaces a much larger volume of fluid, all of which must be discharged through the same outlet which serves for the discharge of the cylinder 50. The result is that the rate of travel of the actuating piston 54 is reduced to a fraction of its initial rate and this slowing down occurs smoothly and without any shock whatever to the moving parts. It will be understood that the amount of fluid discharged through the opening 93 is uniform so long as no change in the valve setting is made and that, whereas during the initial movement of the piston 54 the entire discharge was due to the displacement of the piston 54, when the supplementary piston 73 begins to move a very large percentage of the discharge is due to the displacement of the supplementary piston and the rate of displacement by the actuating piston 54 is correspondingly reduced. Viewed from another angle, it may be said that the actuation of the supplementary piston tends to increase the back pressure upon the actuating piston and so reduce its rate of travel. It also reduces the volume of the exhaust space ahead of the piston 54.

The rapid movement of the actuating piston, as will be understood, brings the grinding wheel almost into initial contact with the work. The continued slow movement of the actuating piston in completing its stroke effects the grinding feed. The movement of the actuating piston is not only reduced by the action of the supplementary piston 73 but it is still further reduced by the closing of the valve 88 of the direct port, which occurs rapidly as the supplementary piston 73 is moved toward the left in Fig. 4 and the arm 68 rocked in the same direction, allowing the lever 86 to swing and the valve to close. When this valve is fully closed, the only available discharge outlet is through the by-pass port controlled by the needle valve 82. The final portion of the stroke of the actuating piston 54 is, therefore, reduced to an extremely slow rate so that the grinding operation is performed at a suitable slow rate.

The grinding feed movement is positively limited by the engagement of the stop nuts 78 with the boss of the supplementary cylinder head, the position of these nuts having been set with reference to the scale 79. When these stop nuts engage the stationary boss, movement of the piston rod is arrested and, consequently, the travel of the actuating piston. It will be noted that the five-to-one ratio of the arms of the rocker 64 contributes to the accuracy of the stopping point of the actuating piston as determined by the setting of the stop nuts. It will be apparent that throughout the operative stroke of the actuating piston 54 the latter is subjected to the uniform fluid pressure developed by the pump 112 and that this pressure is maintained when the movement of the piston is arrested.

The grinding wheel may be permitted to grind itself out in the work in the final position of the piston 54 and its connected carriage 32 until all strains in the work and in the machine are relieved. When this point is reached, the operator will lift the valve handle 108 of the controlling valve 100, reversing the direction of fluid pressure upon the piston 54. Both pistons will be returned to their initial position, the actuating piston 54 moving at a high rate of speed as the valve 88 of the direct port immediately opens to its full extent. During the reverse stroke of the actuating piston, the inlet pipe 52 serves as an exhaust pipe and the oil in the cylinder 50 is returned through the exhaust pipe 110 to the reservoir 114. Incidentally, it will be noted that the reverse movement of the supplementary piston 73 increases the effective volume of the pressure space behind the actuating piston 54. This, however, does not noticeably retard the movement of the actuating piston on account of the large volume of oil being delivered through the direct port 90.

It will be understood that the mechanism connecting the actuating piston 54 and the supplementary piston 73 permits lost motion to occur during the larger part of the piston travel; for example, while the piston 54 moves from an initial position at the left-hand end of the cylinder 50 into the position shown in Fig. 4. At this point the piston rod extension 56 engages the sliding rod 62 and effects a positive connection between the two pistons. In the swinging movement of the rocker member 64, the arm 68 moves first to permit the lever 86 to swing and the valve 88 to seat and, in its further movement, the arm 68 is carried out of contact with the lever 86.

That feature of the invention in accordance with which a port in the fluid pressure pipe line is closed during the operative stroke of the fluid pressure piston is useful in reducing the grinding feed movement and contributes to the refinement of the machine design. In many cases, however, it may be dispensed with and satisfactory results achieved by the use of a supplementary fluid displacing member alone.

Having thus described my invention, what I claim as new and desire to secure by U. S. Letters Patent is:

1. In a grinding machine comprising a base, a work support and a grinding element support, one of said supports being movable toward the other of said supports to effect a grinding operation, the combination of a fluid pressure mechanism having two relatively movable members one of which is connected to said movable support and the other one to said base, two fluid passages to control the rate of relative movement of said members in one direction at different speeds, and means to automatically render one of said passages inoperative during a predetermined portion of said relative movement.

2. In a grinding machine comprising a base, a work support and a grinding element support, one of said supports being movable toward the other of said supports to effect a grinding operation, the combination of a fluid pressure mechanism having two relatively movable members one of which is connected to said movable support and the other one to said base, two fluid passages to control the rate of relative movement of said members in one direction at different speeds, and means to automatically render one of said passages inoperative during a predetermined portion of said relative movement, and means to vary the size of the other of said passages.

3. In a grinding machine comprising a base, a work support and a grinding element support, one of said supports being movable toward the other of said supports to effect a grinding operation, the combination of a fluid pressure mechanism having two relatively movable members one of which is connected to said movable support and the other one to said base, two fluid passages to control the rate of relative movement of said members in one direction at different speeds, means actuated in timed relation with the movable member to increase the back pressure thereagainst, and means to automatically render one of said passages inoperative during a predetermined portion of said relative movement.

4. In a grinding machine comprising a base, a work support and a grinding element support, one of said supports being movable toward the other of said supports to effect a grinding operation, the combination of a fluid pressure mechanism including a cylinder and piston operably connected to said movable support and said base to move said support in one direction at a rapid rate and then a slow rate through predetermined portions of said movement, and means to control said rates of movement which necessitates the displacement of a larger volume of fluid from said cylinder per unit of distance of movement of said support during said slow rate than during said fast rate.

5. In a grinding machine comprising a base, a work support and a grinding element support, one of said supports being movable toward the other of said supports to effect a grinding operation, the combination of a fluid pressure mechanism including a cylinder and piston operably connected to said movable support and said base to move said support in one direction at a rapid rate and then a slow rate through predetermined portions of said movement, and means to control said rates of movement which necessitates the displacement of a larger volume of fluid from said cylinder per unit of distance of movement of said support during said slow rate than during said fast rate, and includes an adjustable fluid passage to vary the speed of said slow rate of movement.

6. In a grinding machine comprising a base, a work support and a grinding element support, one of said supports being movable toward the other of said supports to effect a grinding operation, the combination of a fluid pressure mechanism including a cylinder and piston operably connected to said movable support and said base to move said support in one direction at a rapid rate and then a slow rate through predetermined portions of said movement, means to vary the extent of said slow movement, and means to control said rates of movement which necessitates the displacement of a larger volume of fluid from said cylinder per unit of distance of movement of said support during said slow rate than during said fast rate.

7. A grinding machine having a work support and a movable grinding wheel slide, a feed mechanism therefor comprising a cylinder and piston, a piston rod operatively connecting said piston to move the slide, a fluid pressure system including a reversing valve for conveying fluid under pressure to and from each end of said cylinder to feed the grinding wheel either towards or from the work support, two ports in one end of said cylinder, a valve in each of said ports, and means actuated by said piston rod to close one of said valves when the slide reaches a predetermined position and leaving the other operative, thereby to change the speed of the slide from one definite speed to another.

8. A grinding machine having a movable grinding wheel slide, a feed mechanism therefor comprising a cylinder and piston, a piston rod operatively connecting said piston to move said slide, a fluid pressure system including a reversing valve arranged to convey fluid under pressure to and from each end of said cylinder, two ports in one end of said cylinder, a valve in each of said ports, means actuated by said piston rod to close one of said valves when the slide reaches a predetermined position and leaving the other port operative, thereby to change the speed of the slide from one definite speed to another, and means to vary the aperture of the second valve to change the rate of fluid flow and the speed of the slide.

9. A grinding machine having a movable grinding wheel slide, a feed mechanism therefor comprising a cylinder and piston, a piston rod operatively connecting said piston to move said slide, a fluid pressure system including a reversing valve for conveying fluid under pressure to and from each end of said cylinder, two ports in one end of said cylinder, a valve in each of said ports, means actuated by said piston rod to close one of said valves when the slide reaches a predetermined position and leaving the other operative, thereby to change the speed of the slide from one definite speed to another, means to vary the aperture of the second valve to change the rate of fluid flow and the speed of the slide to produce the desired feed of the grinding wheel, and means including an adjustable stop which is arranged to limit the movement of said piston, and thereby stop the feeding movement of the grinding wheel.

10. Feed mechanism for a machine tool, comprising a cylinder having a piston therein, a pressure chamber communicating with said cylinder and having a restricted outlet, said piston acting to displace fluid from said cylinder and chamber through said outlet, and means acting to change the rate of displacement by said piston at a predetermined point in its stroke.

11. A feed mechanism for a machine tool, comprising a tool slide, a cylinder having a piston therein, one of which is connected to move the slide, and a communicating outlet through which said piston acts to displace fluid from the cylinder, and separate means actuated in timed relation with said piston after a predetermined movement thereof for displacing fluid through the same outlet, thereby increasing the back pressure and changing the rate of piston displacement, thus producing a predetermined feed of the tool slide.

12. Feed mechanism for a machine tool, comprising a cylinder, an actuating piston therein movable under constant pressure to move the tool, a fluid pressure chamber having an outlet, a second piston within said chamber which cooperates with the actuating piston to maintain a uniform rate of discharge from said pressure chamber, and means for changing the rate of displacement effected by the respective pistons.

13. A feed mechanism for a machine tool having a tool slide, comprising a fluid pressure cylinder and an actuating piston therein which are operatively connected to move the slide, means forming a fluid pressure chamber having a fluid outlet, and means including a second piston located within said chamber and effective to discharge fluid through said outlet which cooperates with the actuating piston to increase the back pressure on the latter when it has reached a predetermined position in its travel and thereby cause the slide to move at a second but slower rate.

14. A feed mechanism for a machine tool having a tool slide, comprising a fluid pressure cylinder, an actuating piston therein operatively connected to move said slide, a chamber having an exhaust port, means including a second piston within said chamber effective to create a back pressure against said actuating piston after the latter has reached a predetermined position, and means for varying the back pressure thus created and controlling the rate of movement of the tool slide while the second piston is effective.

15. A feed mechanism for a machine tool having a tool slide, comprising a fluid pressure cylinder, a fluid actuating piston therein which is operatively connected to move said slide, a chamber having an exhaust port, and means including a second piston in said chamber which is larger than the actuating piston and is effective to force fluid through said port after the actuating piston has reached a given position, said second piston being moved by the actuating piston and serving to increase the back pressure upon the latter and thereby control the rate of movement of the tool slide.

16. A feed mechanism for a machine tool having a tool slide, comprising a fluid pressure cylinder, a fluid actuating piston therein which is operatively connected to move said slide, a chamber connected to the cylinder on one side of said piston and having an exhaust port, a second piston of larger diameter than that of the first located within said chamber, said parts being so arranged that both of said pistons operate to discharge fluid through said port, and a lost motion connection between said pistons whereby the second piston is not rendered effective until the first piston has moved a predetermined distance, and the back pressure on the first piston is increased thereafter so as to cause the slide to move at a slower rate.

17. A feed mechanism for a machine tool having a tool slide, comprising a fluid pressure device including a cylinder and piston one of which is operatively connected to move the slide, means forming a fluid outlet from said cylinder, means forming a second cylinder operatively connected to the first and arranged to discharge fluid through said outlet, a piston in the second cylinder, and means for operating said second piston when the first piston has reached a predetermined point in its travel at a higher rate of speed than that of said first mentioned piston whereby it establishes an increased back pressure on the first piston and causes the slide to move at a slower rate.

18. A feed mechanism for a machine tool having a slide, comprising a fluid pressure cylinder, an actuating piston therein operatively connected to move said slide, said cylinder having an outlet port for the discharge of fluid therefrom, means forming a second cylinder connected to discharge through the same port, a piston therein, and a rocker member interposed between the two pistons for operating the second piston after the former has reached a predetermined position and thus to introduce a back pressure against the actuating piston and cause the slide to move at a slower rate.

19. A feeding mechanism for a grinding machine having a wheel slide, comprising a fluid pressure cylinder and piston operatively connected to move the grinding wheel slide, means for controlling the extent of movement of the slide including a secondary cylinder and piston operatively connected to and actuated by the first named piston, and means for adjustably limiting the stroke of the secondary piston to stop the other piston and the feeding movement of the grinding wheel slide.

20. Feed mechanism for a machine tool, comprising a fluid pressure cylinder, a tool actuating piston therein, a secondary cylinder having a common discharge outlet with the first cylinder, a piston therein, and mechanism for simultaneously moving said secondary piston and changing the effective size of said outlet to produce a slower but uniform feed of the tool.

21. Feed mechanism for a machine tool, comprising a fluid pressure cylinder, a tool actuating piston therein, a secondary cylinder, said cylinders being arranged to discharge through an outlet having two ports, a piston in said secondary cylinder, and mechanism for simultaneously moving said secondary piston and closing one of the two ports to produce a slower but uniform feed of the tool.

22. Feed mechanism for a machine tool, comprising a source of fluid pressure, a fluid pressure cylinder, a tool actuating piston therein, a controlling valve for admitting fluid under pressure to either side of said piston, means forming a secondary chamber into which said cylinder discharges and which has an exhaust port therefrom and means acting to decrease the exhaust space in said chamber and ahead of the piston while the latter is making its operative stroke so as to produce a slower feed of the tool.

23. Feed mechanism for a machine tool, comprising a fluid pressure cylinder, a secondary cylinder, an intermediate pressure chamber communicating with both cylinders and having an exhaust passage with two ports, an actuating piston in said first-mentioned cylinder and a secondary piston in said secondary cylinder having a lost motion operating connection with the actuating piston, whereby its stroke is delayed, and a valve for one of said ports arranged to be closed when the secondary piston becomes effective and to cooperate in increasing the back pressure upon said actuating piston.

24. A feed mechanism for a machine tool having a slide, comprising a fluid pressure cylinder, an actuating piston therein connected to move the slide, a rod movable in a path parallel to the piston, a pivotally mounted arm actuated by said piston and connected at one end to move said rod, said parts being so arranged that when the piston has reached a position near the end of its path, the rod will move faster than the piston, means forming a chamber connected to said cylinder, a second piston in said chamber connected to be moved by said rod, and an adjustable stop for arresting the movement of the rod, said chamber and cylinder having an exhaust port through which fluid is discharged by the movement of both of said pistons.

WARREN F. FRASER.